United States Patent [19]

Ojima et al.

[11] Patent Number: 4,722,720
[45] Date of Patent: Feb. 2, 1988

[54] TENSION PROVIDING DEVICE

[75] Inventors: Juji Ojima, Ebina; Isao Hino, Miyata, both of Japan

[73] Assignee: NHK Spring Co., Ltd., Yokohama, Japan

[21] Appl. No.: 853,883

[22] Filed: Apr. 21, 1986

[30] Foreign Application Priority Data

| Apr. 30, 1985 [JP] | Japan | 60-92958 |
| Dec. 31, 1985 [JP] | Japan | 60-298298 |

[51] Int. Cl.$^4$ ............................................. F16H 7/08
[52] U.S. Cl. ..................... 474/101; 474/138; 74/18.2
[58] Field of Search ............... 474/101, 109, 111, 144, 474/136, 138; 74/18.2, 18, 566

[56] References Cited

U.S. PATENT DOCUMENTS

| 3,927,576 | 12/1975 | Colletti | 74/18.2 X |
| 4,466,802 | 8/1984 | Ojima et al. | 474/138 |
| 4,472,161 | 9/1984 | Ojima | 474/111 |
| 4,502,572 | 3/1985 | Davidson et al. | 74/18.2 X |
| 4,506,768 | 3/1985 | Innocent | 74/18.2 X |
| 4,537,289 | 8/1985 | Vongruberg et al. | 74/18.2 X |

FOREIGN PATENT DOCUMENTS

| 0059051 | 5/1981 | Japan | 474/111 |
| 0040149 | 3/1982 | Japan | 474/111 |
| 1038657 | 8/1983 | U.S.S.R. | 474/111 |

*Primary Examiner*—James A. Leppink
*Assistant Examiner*—Thuy M. Bui
*Attorney, Agent, or Firm*—Fleit, Jacobson, Cohn & Price

[57] ABSTRACT

In a tension providing device having a rotary shaft which rotates the spring force in an inserted casing, a pushing body which slide in an axial direction by the aid of the rotation of the rotary shaft, a seal bolt screwed with the base end portion of the casing, and a boot which covers between casing and pushing body, the mixing of dust and foreign matters from outside and the leakage of the lubricant coated or filled in the inner portion are prevented due to the covering of the boot and seal with bolt.

5 Claims, 8 Drawing Figures

TENSION PROVIDING DEVICE

BACKGROUND OF THE INVENTION

This invention relates to a tension providing device which provide a fixed tension. More particularly, this invention relates to a tension providing device by pressing a chain or a timing belt which drives a cam shaft of an engine of 2 wheel automobile or 4 wheel automobile.

A tension providing device is generally used as a chain tensioner or a belt tensioner.

This operation is carried out so as to press the chain or the belt in a fixed direction when the chain or the belt extends or slackens or even if a distance between pulleys changes. By this, the chain or the belt is provided a fixed tension.

A conventional tension providing device used for this purpose will be described in details referring to FIG. 6 and FIG. 7.

This tension providing device is developed by the same inventor of this invention.

The material portions of this invention are composed of:

A casing 1 having a cavity portion 1a in an axial direction.

A rotary shaft 2 inserted pivotally in a base portion side (right end portion) of the casing 1.

A pressing body 3 screwed with the top end portion of this rotary shaft.

A torsion spring which is inserted in the rotary shaft outwardly and provides a rotary force to the rotary shaft, one end 4a of said torsion spring being inserted in a latching groove 2a the rotary shaft and another end 4b being inserted into a long groove 1b at the top end of the casing, and a seal bolt 6 screwed with a base end portion of the casing 1 through an O-ring.

In the casing 1 a flange portion 1g having an attached hole 1f is formed at the periphery of the top end side of a cylinder having a cavity portion. This device is attached to an objective device by the insertion of a bolt at the attaching hole thereof.

At the top end portion of the pushing body 40, a cap 8 is pimed with a spring pin 7. The cup 8 presses a chain or a belt so as to maintain a fixed tension. The pushing body 3 is formed nearly an oval in the periphery thereof. And restrained so that it may not rotates when it is inserted in a bearing a formed to be a same shape sliding hole as the periphery of the pushing body. Accordingly, the rotary movement of the rotary shaft 2 is changed to the sliding movement of the pushing body 3 in the axial direction, whereby the pushing body 3 is adapted to advance to the outside the casing.

Protruding pieces 9a are provided at the trisected portions of the outer circumference of the bearing 9 respectively, said each protruding piece 9a being screwed with a dent portion 1e provided at the inner circumference of the top end portion of the casing 1 to prevent the rotation. Further, a cir-clip is inserted in a ring groove provided at the inner circumference of the top end portion of the casing from outside the bearing 9 to prevent the removing.

The rotation of the rotary shaft 2 is carried out by the torsion spring secured to the outside the shaft 2. This torsion spring 4 is previously wound to provide a fixed torque, thereby rotating the rotary shaft with the aid of stability force.

In drawings, the numeral 10 is a stopper, said stopper latching the top end thereof to a latching groove 2a of the rotary shaft and the base end portion thereof to the stopper groove IC respectively to lock the rotation of the rotary shaft.

Such tension providing device locks the rotation of the shaft 2 with stopper 10 in a state that said torsion spring is wound and is fixedly attached to an outer wall of a machine such as engine or the like with bolts in a locking state. In use, the stopper is separately removed from the casing 1 and the bolt 6 is screwed with base end portion of the casing 1 to seal. By this base end portion of the casing 1 to seal. By this removing of the stopper 10, the rotary shaft 2 rotates with the aid of the stability of the torsion spring 4, thereby advancing the pushing body 3. This rotation further pushes the chain or the belt to act so as to provide a fixed tension.

However, this conventional device has the following defects.

In the conventional device, since the base end side of the casing 1 is sealed with O-ring and seal bolt, the seal is very good. However, the top end portion of the casing inserted therein is inferior to the seal. In other words, since a B portion of a long groove 1b wherein another end 4b of the torsion spring 4 is inserted, a C portion where a pushing body 3 contacts with a bearing 9, a D portion where the bearing 9 internally contacts with casing 1, a E portion where the pushing body 3 contacts with cap 8, a F portion which is an axis of spring pin 7 which pins the cap 8, and a G portion where the spring pin 7 contacts with cap 8 are not subjected any sealing treatment, these portions are inferior to the seal.

Accordingly, when these device is used as it is, said device occurs corrosion in each member or mixing of foreign matters such as dust and the like due to the inner environment, thereby causing a problem to decrease the normal operation of said device. In order to maintain the normal operation of the device, the coating of lubricant to each member and the filling the lubricant in the casing are performed. However, the seal is still incomplete and a fundamental solution such as leakage of said lubricant to the outside.

The leakage of said lubricant oil presents a specially important problem when the conventional device is used as a belt tensioner. When the conventional device is used as a chain tensioner, its chain is usually suspended in an environment surrounded by oil such as in a tank or the like. Accordingly, since the conventional device is used in a state having no lubricant or a state causing no trouble even if the lubricant leaks, such leakage presents no real problem. However, when the conventional device is used as a belt tensioner, since it is suspended in air outside an engine case in like manner to a timing belt, it is used in a state filled with lubricant oil. Accordingly, if the lubricant oil leaks, the lubricant oil may not only stick to the belt, but also obstruct its operation and deteriorate the belt itself. Accordingly, if the conventional tension providing device is used as a belt tensioner, the leakage problem of said lubricant oil must be solved.

SUMMARY OF THE INVENTION

The object of this invention is to provide a tension providing device which increases the inner seal of the casing by dissolving the above problems.

In order to achieve this object, the tension providing device according to this invention is characterized in that there is provided with a boot which covers between the casing and the pushing body which moves against the casing so as to be able to expand or contract.

The boot which covers between casing and the pushing body intercepts the all of the portion wherein a long groove formed in the casing and a bearing which contact with pushing body, a portion wherein the bearing is supported by casing, a portion wherein a cap is attached to the pushing body, a bearing portion of the spring pin, and a portion wherein the spring pin contact with pin from the environment by covering the space between said casing and the pushing body. The boot expands or contracts maintaining the covering state between casing and pushing body according to the sliding of the pushing body.

Further, the tension providing device of this invention is to increase the seal effect at the base end portion side by securing the seal bolt at the base end portion of the casing.

DETAILED DESCRIPTION OF THE INVENTION

Figure 1:
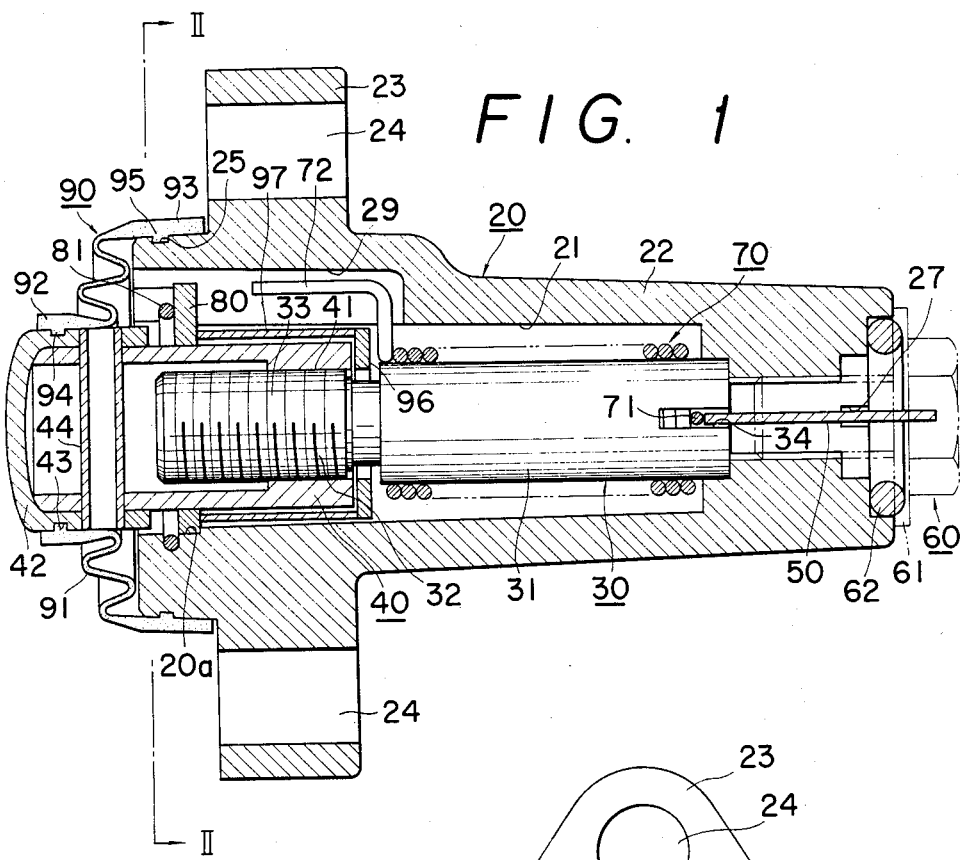
FIG. 1 is a longitudinal sectional view of an embodiment of the invention.
Figure 2:
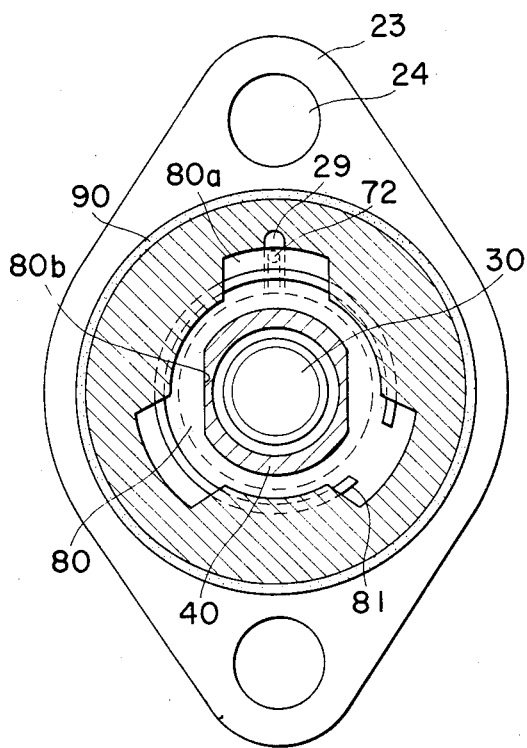
FIG. 2 is a sectional view of FIG. 1 in II—II line.

The tension providing device of this invention is, as shown in FIG. 1 to FIG. 2, is provided with a casing 20 having a cavity 21 in an axial direction, a rotary shaft 30 inserted in a cavity 21 of the casing, a pushing body 40 having a cylindrical shape screwed with the top end portion of the rotary shaft 30, a stopper 50 and a seal bolt 60 attached to the base end portion (right end portion of the embodiment shown by figure) of the casing 20, a torsion spring 70 which rotates said rotary shaft 20, and a boot 90 attached between casing 20 and pushing body 40.

Figure 5:
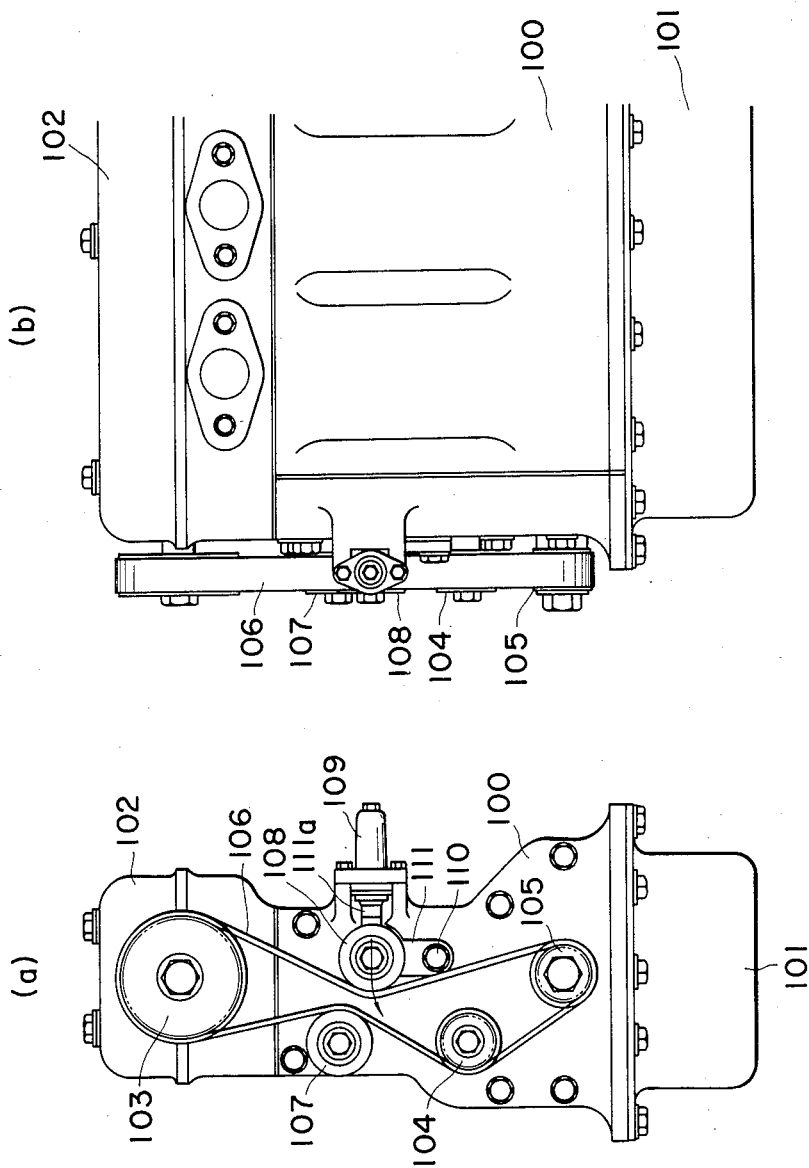
FIG. 5 (a)(b) are an elevation view of the engine and a partial side view which illustrate the using state of this invention respectively.
Figure 6:
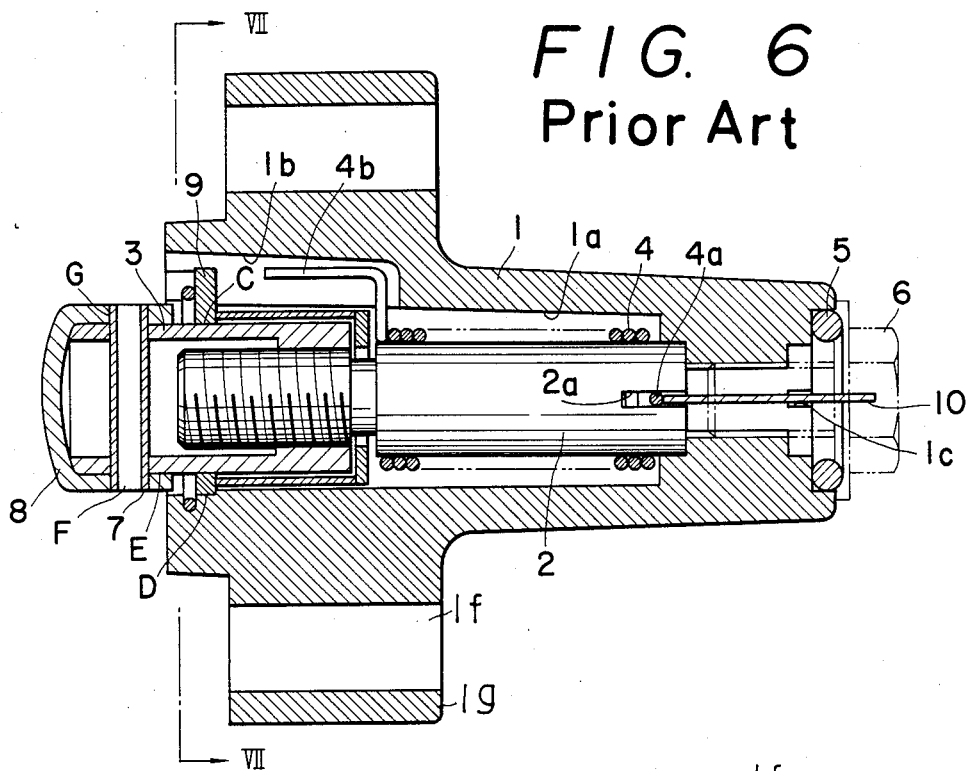
FIG. 6 is a longitudinal sectional view of a conventional device.
Figure 7:
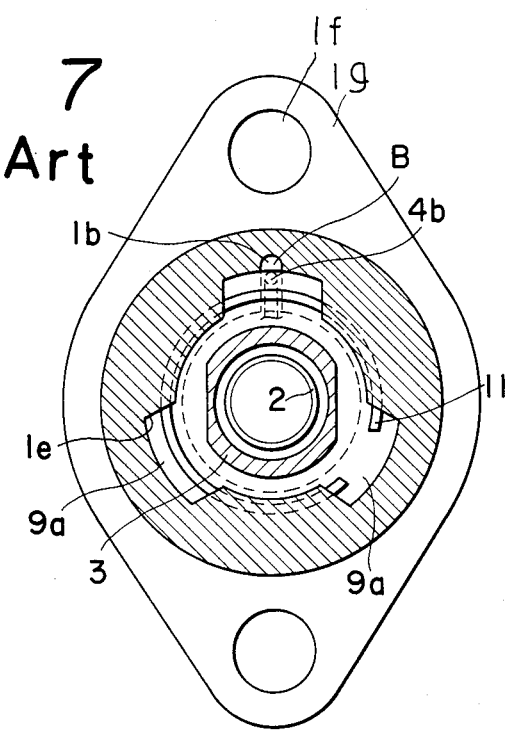
FIG. 7 is a sectional view in VII—VII line of FIG. 6.

The casing 20 comprises a transversly long cylinder portion 22 and a flange portion 23 continuously mounted at the top end side of the cylinder portion 22 vertically crossing therewith. An attaching hole 24 is openly provided at the upper and lower of the flange portion 23 and fixedly secured to an outer wall of the engine 100 (FIG. 5) with bolt. In this secured state, the flange portion 23 is positioned out of the apparatus and the top end portion (left side in FIG. 1) of the flange 23 is positioned in the apparatus. The top end portion (left end portion in FIG. 1) and the base end portion (right end portion in FIG. 1) of the cylinder portion of the casing 20 are both opened. The rotary shaft 30, the pushing body 40 and the torsion spring 70 are inserted from the top end side, and at the opening side of the base end portion the stopper 50 and the seal bolt 60 are secured.

The rotary shaft 30 consists of a large diameter portion 31 and a small diameter portion 32, at the outside the large diameter portion 31 the torsion spring 70 being inserted outwardly, while the small diameter portion being screwed with pushing body 40. The screwing with pushing body 40 is performed by providing a male portion 33 at the periphery of the small diameter portion 32 and a female portion 41 at the inner circumference of the pushing body 40, whereby the both male portions are screwed with each other. Further, one end of the torsion spring 70 outwardly inserted in the large diameter 31 is inserted in the latching groove 34 perforated in the axial direction from the base end surface of the large diameter 31, while another end 72 is bent like an L shape and inserted in a long groove 29 formed in the casing 20.

Accordingly, when the torsion spring 70 is constructed in a state wherein a fixed torque is provided by being screwed, the rotary shaft 30 is adapted to rotate by a stability of the torsion spring 70.

The pushing body 40 is inserted in to the cavity 21 of the casing 20 in a state wherein said pushing body 40 is screwed with the small diameter portion 32 of the rotary shaft 30. The screwed portion of the pushing body 40 with rotary shaft 30 is supported by the bearing 80, said bearing 80 being secured to the top end portion of the cylinder 22 of the casing 20. Further, a sliding hole 80b having nearly a oval shape as shown in FIG. 2 is formed at the bearing 80 and the pushing body 40 is inserted into the sliding hole 80b by being formed so as to be same shape periphery as the sliding hole 80b. By this bearing 80, the screwed portion of the pushing body 40 with rotary shaft 30 is releasbly supported and since the pushing body 40 does not rotate even if the rotary shaft 30 rotates, only the sliding in the axial direction is adapted to be performed. Further, together with protruding the pawls 80a of three pieces to the outside from the outer surface of the bearing 80, a cutaway portion 20a wherein the pawl 80a is inserted at the top end surface of said casing 20 is formed. Accordingly, the bearing 80 is attached so that it may be not rotated by inserting the pawl 80a in the cutaway 20a abutting the bearing 80 to the top end surface of the casing 20. At the periphery of the top end of the said casing 20, a periphery groove is formed. After the insertion of the bearing 80, the bearing can be prevented from falling off by insertedly attached a cir-clip at the periphery thereof.

Figure 3:
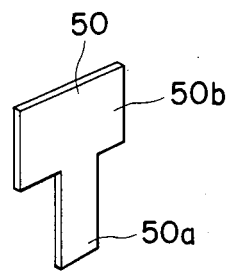
FIG. 3 is a perspective view of the stopper used in said embodiment.

The stopper 50 secured to the base portion side of the casing consists of a slender latching piece 50a and an operation piece 50b continuously connected to the latching piece 50a as shown in FIG. 3. The latching piece 50a is inserted in said latching groove 34 of said rotary shaft 30. On the other hand, the operation piece 50b is inserted in the base end side of the casing 20 so that a latching state with casing 20 may be maintained. In other words, a stopper groove 27 is formed at the base end portion of the casing 20 as shown FIG. 1 and the operation piece 50b is inserted in this stopper groove 27. The stopper 50 is adapted to lock the rotary shaft 30 so that it may not rotate.

The seal bolt 60 is screwed with the casing 20 from the base portion side to seal so that dust, waters and the like may not invade in the cavity 21 of the casing 20. For this purpose, a brim 61 which covers the base end portion of the opened casing is formed. Further, when the bolt 60 is screwed, an O-ring 60 is inserted between casing 20 and a brim 61 to increase the seal effect.

Further, the bolt 60 is screwed with casing 20 to seal after removing said casing 20.

A cap 42 is coated at the top end portion of said pushing body 40. This cap 42 abuts the chain, the belt and the like in the apparatus directly or indirectly to press in a fixed direction, thereby amending the slackness of the chain or the belt. In such tension providing device, the boot 90 is bridged between said 20 and cap 42 secured to the pushing body 40. The boot 90 is formed by a flexible material such as a rubber or the like, and comprises a trunk portion 91 constitute an expansion and a contract portions and a ring shape latching portions 92, 93 continuously connected with both ends of said trunks 91. In this case, one latching portion 92 is formed to be slightly smaller diameter than the outer diameter of the cap 42, while another one is formed slightly smaller inner diameter than the outer diameter at the top end portion of the casing 20. Each latching portion 92, 93 is attached to the periphery to the cap 42 or of the top end portion of the casing 20 being provided with a proper enlargement. In this case, at the inner periphery of each latching portion 92, 93, ribs 94, 95 are formed respectively, while at the outer periphery at the top end portion of the cap and the casing, periphery grooves 43, 25 inserted with ribs 94, 95 are respectively formed to fix the latching portions 92, 93. The trunk portion 91 is formed in a continuous wave shape. This wave form is formed so as to be able to fold in a direction which is nearly vertical against the sliding direction of the pushing body.

Figure 4:
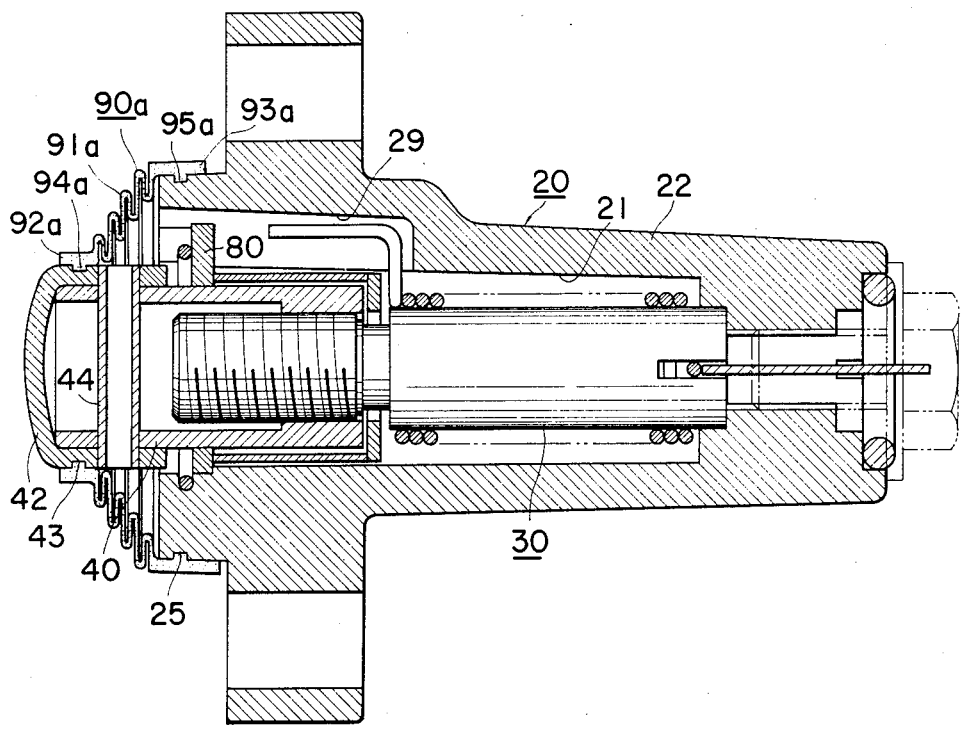
FIG. 4 is a longitudinal sectional view of another embodiment of this invention.

FIG. 4 shows another embodiment of boot. This boot 90a is formed by a flexible material such as a rubber or the like and consists of a trunk portion 91a having a bellows shape and ring shape latching portions 92a, 93a attached to the both end portions of trunk 91a.

At the inner periphery surface of each latching portion 92a, 93a, ribs 94a, 95a which inserted in periphery grooves 42, 43 mounted on a cap 42 and casing 20 respectively are formed as in said boot 90. The trunk portion 91a which expands or contracts according to the movement of the pushing body 40 is formed to be a continuous wave shape which is possible to fold in the sliding direction of the pushing body. These boots 90, 90a cover the cavity of the top end portion between cap 42 and casing 20 and further expands or contracts according to the sliding of the pushing body 40 maintaining the covering states. Accordingly, by securing these boots 90, 90a, since a portion wherein the long groove 29 and bearing 80 formed in the casing 20 contact with pushing body 40, a portion wherein the bearing 80 is supported by casing 20, an axial portion of the spring pin 44, and a portion wherein the spring pin 44 contacts with cap 44 are all intercepted from the outer environment, the corrosion of the members and mixing of foreign matters do not occur due to the occurrence of effective seal.

Particularly, since the wave shape of the trunk portion 91 in said boot 90 is formed so as to be able to fold nearly in the vertical direction against the sliding direction of the pushing body 40, when the trunk portion 91 expands or contracts according to the sliding of the pushing body 40, the volume change in the casing 20 closely sealed by boot 90 and seal bolt 60 decreases and a great change of the inner pressure is restrained. Accordingly, even if the lubricant is sealed in the casing 20 or the lubricant is coated on each member, the lubricant spreads smoothly due to a little change of inner pressure, a good lubrication can be performed and the leakage of the lubricant to the outward can be also restrained.

In drawing, the numeral 96 is a washer, and 97 is a spacer, and these are attached between a larger diameter portion 31 of the rotary shaft 30 and the bearing 80 to prevent removing of the base end portion of the rotary shaft 30 from the seat portion of the casing 20.

Then, the construction of this device thus constituted is described as follows.

After the insertion of the washer 96 outwardly to a small diameter portion 32 of the rotary shaft 30, a subassembly is composed by being screwed the pushing body 40 with said small diameter portion 32.

Then, the torsion spring 70 is inserted into the cavity portion 21 from the opening of the top end of the casing 20 and another end portion 72 is inserted into the long groove 29 perforated in the casing 20. The subassembly is inserted into the cavity portion 21 positioning the latching groove 34 of the rotary shaft 30 to one end 71 of the torsion spring 70.

After that, a tool such as driver or the like is inserted from the opening portion of the base end side of the casing 20 and the subassembly is turned in the clockwise by latching the top end of said tool with the latching groove 34 of the rotary shaft 30, thereby winding the torsion spring 70 to storage the energy. In this energy storage state, the pushing body 40 is strongly held so that the subassembly may not rotate. Then, after removing the driver, the stopper 50 is bridged between the latching groove 34 of the rotary shaft 30 and the stopper groove 27 of the casing 20 to lock the rotation of the rotary shaft 30.

Then, the spacer 97 is inserted outwardly in the subassembly from the pushing body 40 side. After that, the bearing 80 is inserted in a dent 20a properly provided at the top end opening portion of the casing 20 outwardly inserting in the pushing body from the out side of the spacer 97. Further, the cir-clip 81 is inserted in the groove of the casing 20 from the out side of this bearing 80 to prevent the falling off of the bearing 80.

Thus, the operation of the pushing body 40 is confirmed by removing the stopper from the casing 20. After this confirmation, the top end of the pushing body 40 is covered with cap 42 and the spring pin 44 is forcibly inserted. Then, the driver is latched again with latching groove 34 of the rotary shaft 30 and the rotary shaft is turned in the clockwise. The torsion spring 70 is wound to storage the energy again.

After that the boot is bridge between the casing 20 and cap 42 to attach. The attachment is performed by inserting the rib 95 of the boot 90 into the periphery groove 25 and the rib 95 into the periphery groove of the cap 42.

Thus, the construction of this device is completed. In case this device is attached to an engine, this is performed as follows.

FIG. 5(a), (b) are an elevation and a side view of an engine respectively. The numeral 100 is a cylinder block, 101 is an oil pan, and 102 is a cylinder head cover. At the front of the engine, a cam shaft pulley 103, an oil pump pulley 104, and crank shaft pulley 105 are protruded to be secured and an endless timing belt 106 is suspended to these pulleys. This timing belt 106 is provided a proper tension by two idle pulleys 107, 108 abut from the out side. In other words, one pulley 108 of 2 idle pulleys is attached to the idle pulley bracket 111 secured to a cylinder block 100 so as to be able to shake a head portion freely with a center of the axis 110. When the pulley 108 is inclined to a direction shown by the arrow to push the belt 106, said belt 106 is adapted to be provided a suitable tension. In such an engine, this device 109 is attached to the engine availing an attached hole 24 of the casing 20. In this case, the pushing body 40 is positioned at the side of idle pulley 108 and the top end of the pushing body 40 abut to the protruded portion 111a of the top end side of the idle pulley bracket 111, thereby being fixed it to the project portion of the cylinder block 100 with bolt.

After that, the stopper 50 is removed from the casing 20 and this device 109 is operated. The O-ring 62 is thus inserted in the opening portion at the end of the casing 20, thereby sealing it being screwed with seal bolt 60. By this, the pushing body 40 of this device advances outwardly and the idle pulley 108 is clined to the belt 106 side through the idle pulley bracket 111 to act to provide a suitable tension to the belt 106. Although the advancement of the pushing body 40 outwardly stops by balancing with the tension of belt 106, the pushing body 40 further advances in order to maintain a new balancing state in accordance with the decrease of the tension of belt 106.

Further, although in the above embodiment the cap is provided at the top end of the pushing body, a pushing body having a sealed top end portion may be used because the cap is not attached thereon.

As described above, since the space between the casing and the sliding pushing body in this invention is covered with boot which acts to expand or contract freely and the opening portion at the base end side of the casing is closely sealed with a seal bolt, there occur no mixing of dusts and foreign matters in the casing from outside and the leakage of the lubricant coated or filled in the inner portion can be prevented. By this reason, the tension providing device of this invention is perfect for anti-corrosion to the inner construction parts and a stable operation can be performed for a long period in maintainance free state.

Further, since the tension providing device according to this invention can prevent the leakage of lubricant oil, it is possible to use it as a belt tensioner. Accordingly, the range of its use is widely enlarged as compared with the conventional device and a wide utilization of the tension providing device is attained.

We claim:

1. A tension providing device particularly for use as a belt tensioner, said tension providing device comprising:
    a casing,
    a shaft within the casing,
    a pusher member connected to the shaft and projecting from one end of the casing, a sealed environment being defined between said casing and said pusher member,
    liquid lubricant means located in said sealed environment,
    a force-transmitting mechanism within the casing for urging the pusher member outwardly from the casing, and
    an expandable-contractible protective boot of pleated tubular form providing a lubricant leakage-preventing seal in said sealed environment for absorbing volume change of said liquid lubricant means upon movement of the shaft with respect to the pusher member while maintaining said liquid lubricant means totally within said sealed environment, the boot having a first rim portion at one end embracing said one end of the casing and a second rim portion at the opposite end embracing the pusher member.

2. A device as claimed in claim 1 wherein the first and second rim portions of the boot are stretched over the one end of the casing and the pusher member respectively and are provided with respective internal circumferential ribs engaging in respective circumferential grooves in the casing and the pusher member.

3. A device as claimed in claim 1 wherein the boot has pleats oriented predominantly perpendicularly to the axis of the shaft.

4. A device as claimed in claim 1 wherein the boot has pleats oriented predominantly in parallel to the axis of the shaft.

5. A device as claimed in claim 1 wherein the drive mechanism includes a spring for applying a rotary force to the shaft and a threaded connection between the shaft and the pusher member to convert the rotary motion of the shaft to linear motion of the pusher member.

* * * * *